United States Patent
Hickman et al.

(10) Patent No.: US 8,965,104 B1
(45) Date of Patent: Feb. 24, 2015

(54) MACHINE VISION CALIBRATION WITH CLOUD COMPUTING SYSTEMS

(75) Inventors: Ryan M. Hickman, Mountain View, CA (US); James R. Bruce, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 244 days.

(21) Appl. No.: 13/601,319

(22) Filed: Aug. 31, 2012

Related U.S. Application Data (60) Provisional application No. 61/597,495, filed on Feb. 10, 2012.

(51) Int. Cl.
*G06T 1/00* (2006.01)

(52) U.S. Cl.
USPC ........... 382/153; 382/254; 382/276; 700/246; 700/253

(58) Field of Classification Search
None
See application file for complete search history.

(56) References Cited

U.S. PATENT DOCUMENTS

| | | | |
|---|---|---|---|
| 5,835,627 A * | 11/1998 | Higgins et al. | 382/167 |
| 6,301,396 B1 | 10/2001 | Michael | |
| 7,656,425 B2 | 2/2010 | Tobiason | |
| 7,957,583 B2 | 6/2011 | Boca | |
| 2002/0181786 A1* | 12/2002 | Stark et al. | 382/225 |
| 2004/0102682 A1* | 5/2004 | Zahlmann et al. | 600/300 |
| 2006/0182361 A1* | 8/2006 | Ptucha et al. | 382/254 |
| 2007/0076934 A1* | 4/2007 | Krishnan et al. | 382/128 |
| 2007/0133851 A1* | 6/2007 | Sirohey et al. | 382/128 |
| 2007/0206228 A1* | 9/2007 | Miyagi | 358/3.21 |
| 2007/0233321 A1* | 10/2007 | Suzuki | 700/245 |
| 2012/0032960 A1* | 2/2012 | Kameyama | 345/428 |
| 2012/0197464 A1* | 8/2012 | Wang et al. | 701/2 |

OTHER PUBLICATIONS

Bistry et al. "A Cloud Computing Approach to Complex Robot Vision Tasks Using Smart Camera Systems." IEEE/RSJ International Conference on Intelligent Robots and Systems, Oct. 18, 2010, pp. 3195-3200.*

Guizzo. "Robots with Their Heads in the Clouds." IEEE Spectrum, Mar. 2011, pp. 16-17.*

* cited by examiner

*Primary Examiner* — Jon Chang
(74) *Attorney, Agent, or Firm* — McDonnell Boehnen Hulbert & Berghoff LLP (57) ABSTRACT

A cloud computing system is configured to (i) receive image and environmental data from a computing device, (ii) apply a plurality of image processing algorithms to the received image a plurality of times to generate a corresponding plurality of image processing results, where each application of an image processing algorithm to the received image is executed with a different corresponding parameter set, and (iii) based on the image processing results, select an image processing algorithm and corresponding parameter set for the computing device to use for image processing operations. The cloud computing device may also correlate the results of its analysis with the environmental data received from the computing device, and store the correlation in a machine vision knowledge base for future reference. In some embodiments, the computing device is a component of a robot.

21 Claims, 6 Drawing Sheets

MACHINE VISION CALIBRATION WITH CLOUD COMPUTING SYSTEMS

CROSS-REFERENCE TO RELATED APPLICATIONS

The present application claims priority to provisional application 61/597,495 filed on Feb. 10, 2012. The entire contents of the 61/597,495 application are incorporated herein by reference.

BACKGROUND

Cloud computing refers to the provision of computing resources via a computer network. In a traditional model of computing, both data and software are fully contained on a user's computer. In a cloud computing arrangement, however, the user's computer may contain relatively little software or data (perhaps just a minimal operating system and web browser, for example), and may serve as a display terminal for processes occurring on a network of computers. One common shorthand term used to describe a cloud computing system or service (or even an aggregation of cloud services) is "the cloud."

Cloud computing is sometimes referred to as "client-server computing." However, there are distinctions between cloud computing and general client-server computing. For example, client-server computing may include a distributed application structure that partitions tasks or workloads between providers of a resource or service (e.g., servers), and service requesters (e.g., clients). Client-server computing generally involves a one-to-one relationship between the server and the client, whereas cloud computing includes generic services that can be accessed by generic clients such that a one-to-one relationship or connection may not be required. Thus, cloud computing generally includes client-server computing along with additional services and functionality.

In many situations, cloud computing may free users from certain hardware and software installation and maintenance tasks through the use of simplified hardware on the user's computer. Also, because the user's computer can access a vast network of computing resources (e.g., processors, disk drives, etc.), the user is not limited just to the computing and storage power of his or her local computer. Additionally, the sharing of computing resources across many users may reduce computing costs to individuals. For example, multiple computers connected to the cloud may be able to share the same pool of computing power, applications, and files. Users can store and access personal files such as music, pictures, videos, and bookmarks or play games or use productivity applications on a remote server rather than physically carrying around a storage medium, such as a DVD or thumb drive.

In one example, a user may open a web browser and connect to a host of web servers that run user interface software configured to collect commands from the user and interpret the commands into commands on the servers. The servers may handle the computing, and can either store or retrieve information from database servers or file servers and display an updated page to the user. Through "cloud computing," data across multiple servers can be synchronized around the world allowing for collaborative work on one file or project, from multiple users around the world, for example.

SUMMARY

Various embodiments of systems and methods for using cloud computing systems for machine vision calibration are disclosed herein.

Any of the methods described herein may be implemented in the form of instructions stored on a non-transitory, computer readable media. When executed by a computing device, the instructions may cause the computing device to perform functions of the disclosed method. Further examples may also include articles of manufacture including tangible computer-readable media that have computer-readable instructions encoded thereon, and the instructions may comprise instructions to perform functions of the methods described herein.

The computer readable media may include non-transitory computer readable media, such as computer-readable media that stores data for short periods of time like register memory, processor cache, and Random Access Memory (RAM). The computer readable media may also include non-transitory media, such as secondary or persistent long term storage, like read only memory (ROM), optical or magnetic disks, or compact-disc read only memory (CD-ROM), for example. The computer readable media may also be any other volatile or non-volatile storage system. In some embodiments, the computer readable media may be considered a computer readable storage media, for example, or a tangible storage media.

In addition, some aspects of the disclosed methods may be performed by circuitry configured to perform logical functions in any of the processes or methods described herein. In still further examples, many types of devices may be used or configured to perform logical functions in any of the processes or methods described herein. In yet further examples, many types of devices (and/or components or sub-components of the devices) may be used or configured as means for performing functions of any of the methods described herein (or any portions of the methods described herein).

In some embodiments of the disclosed systems and methods, a cloud computing system may be configured to receive an image from an image sensor associated with a computing device. In some embodiments, the computing device may be a robot with a machine vision system, and the image sensor may be a digital camera or other type of image sensor associated with the robot's machine vision system. The cloud computing system may receive multiple images from the robot in some embodiments. In operation, the robot sends the image (or images) to the cloud computing system so that the cloud computing system can analyze the image (or images) and calibrate the robot's machine vision system based on the analysis as described herein.

In some embodiments, the cloud computing system may be configured to apply multiple different image processing algorithms to the received image multiple times. In operation, each image processing algorithm (of the multiple image processing algorithms) may have a number of different corresponding configurable parameters, and each application of a particular image processing algorithm to the image may be executed with a different parameter set that includes one or more image processing parameters for use with that particular image processing algorithm. Applying the multiple different image processing algorithms to the image multiple times with different parameter sets each time enables the cloud computing system to generate a set of image processing results, where each individual image processing result (in the set of image processing results) is the result of one particular application of one particular image processing algorithm configured with one particular parameter set to the image received from the computing device.

The cloud computing system may also be configured to determine a quality score for each image processing result (in the set of image processing results) in some embodiments. In operation, a quality score for a particular image processing result may be determined by comparing attributes of that particular image processing result with a set of quality metrics associated with the image processing algorithm that was used to generate that particular image processing result. After determining a score for the image processing results, the cloud computing system may be configured rank the quality scores from highest to lowest, and then select an image processing algorithm and a corresponding parameter set that was used to generate an image processing result having a corresponding quality score that exceeds a minimum quality threshold. In some embodiments, the cloud computing system may select the image processing algorithm and the corresponding parameter set that was used to generate the image processing resulting having the highest corresponding quality score.

After selecting the image processing algorithm and the corresponding parameter set, the cloud computing may then instruct the computing device that originally sent the image to use the selected image processing algorithm and the selected parameter set for image processing operations. In embodiments where the computing device may already have a copy of the selected image processing algorithm and the selected parameter set stored in local memory, the cloud computing system may just instruct the computing device to execute the stored copy of the selected image processing algorithm with the stored parameter set. However, in some embodiments, the cloud computing system may send one or both of the selected image processing algorithm and the parameter set to the computing device in addition to the instructions to use the selected image processing algorithm and the selected parameter set for image processing operations.

In some embodiments, the computing device may send both an image and environmental data to the cloud computing system. The environmental data may include information about the environmental conditions in the area where in the computing device is operating, including conditions in which the image was captured, such as, for example, the amount of light in the area, the source of the light in the area (e.g., sunlight, fluorescent, incandescent, etc.), the direction of the source of light relative to the sensor that captured the image, the location where the image was captured (e.g., GPS location, inside/outside, etc.), the time of day when the image was captured, the weather conditions when the image was captured, information about the background or objects in the background of the captured image, and/or other similar information.

In operation, the cloud computing system may correlate the environmental data with the selected image processing algorithm and parameter set. Correlating environmental data with selected image processing algorithms and parameter sets may enable the cloud computing system to build and maintain a machine vision knowledge base comprising a collection of which image processing algorithms and parameter sets work well in different environmental conditions. In some embodiments, the cloud computing system may be configured to use the information in the machine vision knowledge base for calibrating machine vision systems for computing devices such as robots. For example, in some embodiments, the cloud computing system may be able to select an image processing algorithm and parameter set based on information stored in the machine vision knowledge base without having to perform the multiple algorithm analysis described above.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

The following detailed description includes references to the accompanying figures. In the figures, similar symbols typically identify similar components, unless context dictates otherwise. The example embodiments described herein are not meant to be limiting. Other embodiments may be utilized, and other changes may be made, without departing from the scope of the subject matter presented herein. It will be readily understood that the aspects of the present disclosure, as generally described herein and illustrated in the figures can be arranged, substituted, combined, separated, and designed in a wide variety of different configurations, all of which are contemplated herein.

Cloud Computing System Overview

Figure 1:
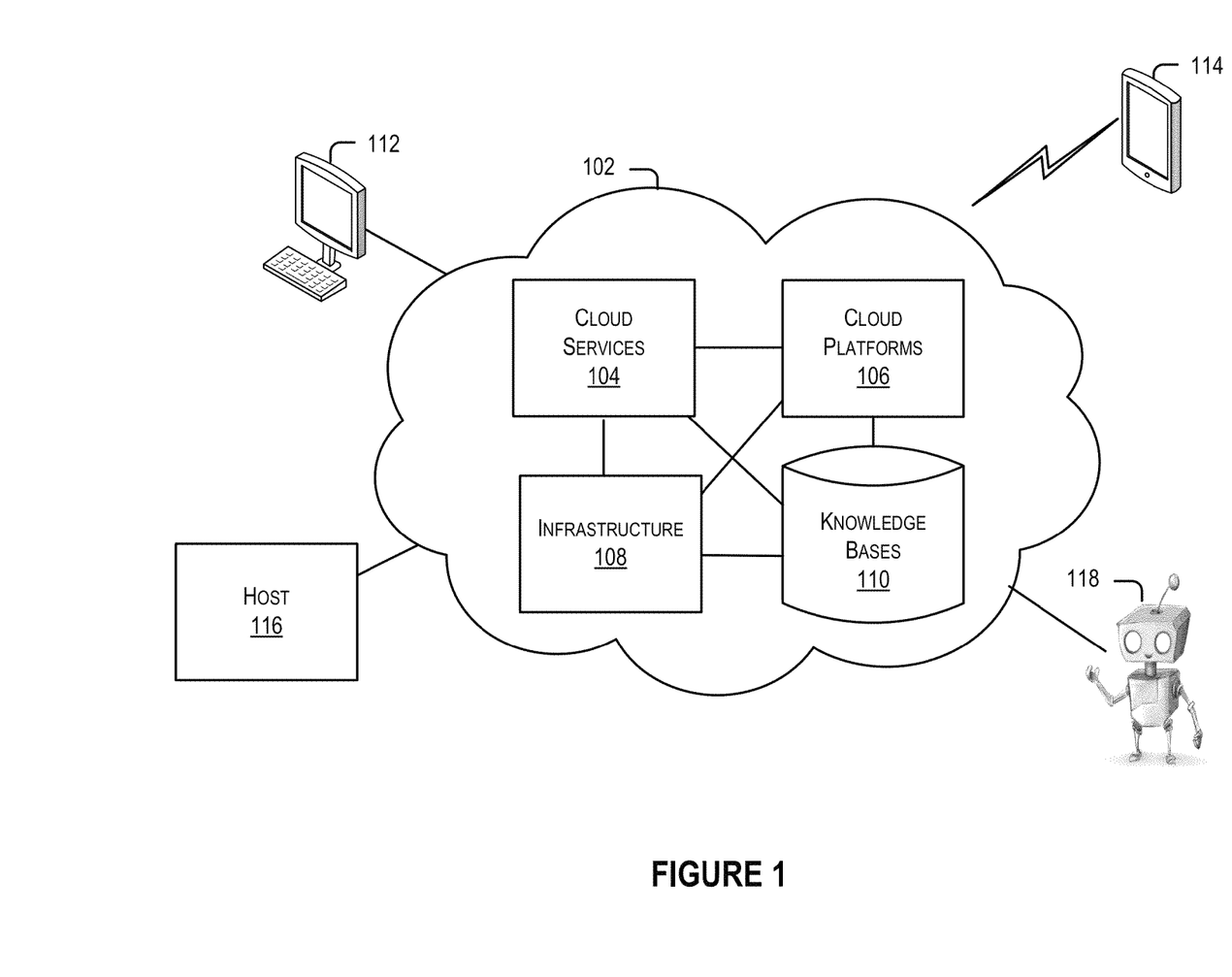
FIG. 1 is a high-level conceptual diagram showing components of a cloud computing system according to some embodiments of the disclosed systems and methods.

FIG. 1 is a high-level conceptual diagram showing components of a cloud computing system 102 according to some embodiments of the disclosed systems and methods. Cloud-based computing generally refers to networked computer architectures where application execution, service provision, and data storage may be divided, to some extent, between clients and cloud computing devices. The "cloud" may refer to a service or a group of services accessible over a network (e.g., the Internet) by clients, server devices, and cloud computing systems, for example.

In one example, multiple computing devices connected to the cloud may access and use a common pool of computing power, services, applications, storage, and files. Thus, cloud computing enables a shared pool of configurable computing resources (e.g., networks, servers, storage, applications, and services) that can be provisioned and released with minimal management effort or interaction by the cloud service provider.

As an example, in contrast to a predominately client-based or server-based application, a cloud-based application may store copies of data and/or executable program code in the cloud computing system, while allowing client devices to download at least some of this data and program code as needed for execution at the client devices. In some examples, downloaded data and program code can be tailored to the capabilities of specific client devices (e.g., a personal computer, tablet computer, mobile phone, smartphone, and/or robot) accessing the cloud-based application. Additionally, dividing application execution and storage between client devices and the cloud computing system allows more processing to be performed by the cloud computing system, thereby taking advantage of the cloud computing system's processing power and capability, for example.

Cloud-based computing can also refer to distributed computing architectures where data and program code for cloud-based applications are shared between one or more client devices and/or cloud computing devices on a near real-time basis. Portions of this data and program code may be dynamically delivered, as needed or otherwise, to various clients accessing the cloud-based application. Details of the cloud-based computing architecture may be largely transparent to users of client devices. Thus, a PC user or a robot client device accessing a cloud-based application may not be aware that the PC or robot downloads program logic and/or data from the cloud computing system, or that the PC or robot offloads processing or storage functions to the cloud computing system, for example.

In FIG. 1, the cloud computing system 102 includes one or more cloud services 104, one or more cloud platforms 106, cloud infrastructure 108 components, and cloud knowledge bases 110. The cloud computing system 102 may include more of fewer components, and each of the cloud services 104, the cloud platforms 106, the cloud infrastructure components 108, and the cloud knowledge bases 110 may comprise multiple computing and storage elements as well. Thus, one or more of the described functions of the cloud computing system 102 may be divided into additional functional or physical components, or combined into fewer functional or physical components. In some further examples, additional functional and/or physical components may be added to the examples shown in FIG. 1. Delivery of cloud computing based services may involve multiple cloud components communicating with each other over application programming interfaces, such as web services and multi-tier architectures, for example.

The example cloud computing system 102 shown in FIG. 1 is a networked computing architecture. The cloud services 104 may represent queues for handling requests from client devices. The cloud platforms 106 may include client-interface frontends for the cloud computing system 102. The cloud platforms 106 may be coupled to the cloud services 104 to perform functions for interacting with client devices. The cloud platforms 106 may include applications for accessing the cloud computing system 102 via user interfaces, such as a web browser. The cloud platforms 106 may also include robot interfaces configured to exchange data with robot clients. The cloud infrastructure 108 may include service, billing, and other operational and infrastructure components of the cloud computing system 102. The cloud knowledge bases 110 are configured to store data for use by the cloud computing system 102, and thus, the cloud knowledge bases 110 may be accessed by any of the cloud services 104, the cloud platforms 106, and/or the cloud infrastructure components 108.

Many different types of client devices may be configured to communicate with components of the cloud computing system 102 for the purpose of accessing data and executing applications provided by the cloud computing system 102. For example, a computer 112, a mobile device 114, a host 116, and a robot client 118 are shown as examples of the types of client devices that may be configured to communicate with the cloud computing system 102. Of course, more or fewer client devices may communicate with the cloud computing system 102. In addition, other types of client devices may also be configured to communicate with the cloud computing system 102 as well.

The computer 112 shown in FIG. 1 may be any type of computing device (e.g., PC, laptop computer, tablet computer, etc.), and the mobile device 114 may be any type of mobile computing device (e.g., laptop, smartphone, mobile telephone, cellular telephone, tablet computer, etc.) configured to transmit and/or receive data to/from the cloud computing system 102. Similarly, the host 116 may be any type of computing device with a transmitter/receiver including a laptop computer, a mobile telephone, a smartphone, a tablet computer etc., which is configured to transmit/receive data to/from the cloud computing system 102.

The robot client 118 may include any type of computing device that is configured to communicate with the cloud computing system 102 and has an actuation capability (e.g., electromechanical capabilities) for moving about its environment and/or interacting with objects in its environment. In some embodiments, the robot client 118 may include various combinations of computing devices, sensors, and electromechanical actuation elements. In some examples, the robot client 118 may collect data via one or more sensors, and upload the data to the cloud computing system 102 via one or more communications interfaces. The cloud computing system 102 may be configured to analyze data received from the robot client 118, and return processed data and/or instructions to the robot client 118. In some embodiments, a robot client 118 may be configured to send and receive data to a remote host 116 via the cloud computing system 102. In other examples, the robot client 118 may be configured to send/receive data to/from another client device via the cloud computing system 102. For example, the robot client may be configured to send/receive information to/from the computer 112, the mobile device 114, and/or even other robots either directly, indirectly via the cloud computing system 102, or indirectly via other network systems.

Any of the client devices used with the cloud computing system 102 may include additional components. For example, the robot client 118 may include one or more sensors, such as a digital camera or other type of image sensor. Other sensors may further include a gyroscope, accelerometer, Global Positioning System (GPS) receivers, infrared sensors, sonar, optical sensors, biosensors, Radio Frequency identification (RFID) systems, Near Field Communication (NFC) chip sensors, wireless sensors, and/or compasses, among others, for example.

Additionally, any of the client devices may also include a user-interface (UI) configured to allow a user to interact with the client device. For example, the robot client 118 may include various buttons and/or a touchscreen interface configured to receive commands from a human or provide output information to a human. As another example, the robot client 118 may also include a microphone configured to receive voice commands from a human. Furthermore, the robot client 118 may also include one or more interfaces that allow various types of user-interface devices to be connected to the robot client 118. For example, the mobile device 114, the computer 112, and/or the host 116 may be configured to run a user-interface for sending and receiving information to/from the robot client 118 or otherwise configuring and controlling the robot client 118.

In FIG. 1, communication links between client devices and the cloud 102 may include wired connections, such as a serial or parallel bus, Ethernet, optical connections, or other type of wired connection. Communication links may also be wireless links, such as Bluetooth, IEEE 802.11 (IEEE 802.11 may refer to IEEE 802.11-2007, IEEE 802.11n-2009, or any other IEEE 802.11 revision), CDMA, 3G, GSM, WiMAX, or other wireless based data communication links.

In other examples, the client devices may be configured to communicate with the cloud computing system 102 via wireless access points. Access points may take various forms. For example, an access point may take the form of a wireless access point (WAP) or wireless router. As another example, if a client device connects using a cellular air-interface protocol, such as CDMA, GSM, 3G, or 4G, an access point may be a base station in a cellular network that provides Internet connectivity via the cellular network.

As such, the client devices may include a wired or wireless network interface through which the client devices can connect to the cloud computing system 102 directly or via access points. As an example, the client devices may be configured to use one or more protocols such as 802.11, 802.16 (WiMAX), LTE, GSM, GPRS, CDMA, EV-DO, and/or HSPDA, among others. Furthermore, the client devices may be configured to use multiple wired and/or wireless protocols, such as "3G" or "4G" data connectivity using a cellular communication protocol (e.g., CDMA, GSM, or WiMAX, as well as for "WiFi" connectivity using 802.11). Other types of communications interfaces and protocols could be used as well.

Robot Overview

Figure 2A:
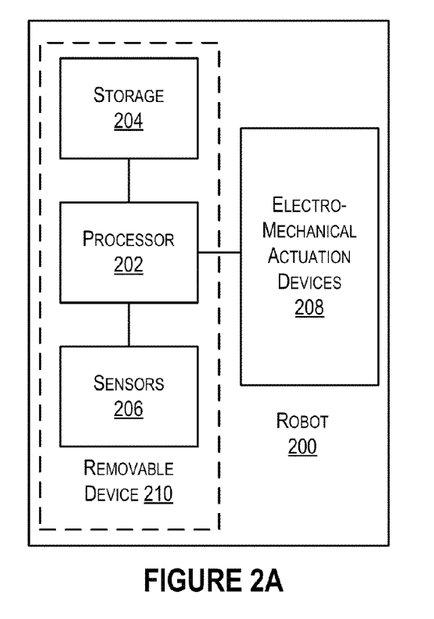
FIG. 2A illustrates a high-level block diagram of a robot according to some embodiments of the disclosed systems and methods.

FIG. 2A illustrates a high-level block diagram of a robot 200 according to some embodiments of the disclosed systems and methods. In the example shown in FIG. 2A, the robot 200 includes a processor 202, memory or storage 204, sensors 206, and electromechanical actuation devices 208.

In some embodiments, one or more of the robot components may be custom designed for a specific robot or for a particular model or type of robot. In other embodiments, one or more of the robot components may be generic to many different robots and/or types of robots. The robot 200 may have one or communications interfaces (not shown) for communicating with the cloud computing system 102 (as shown in FIG. 1). The communications interfaces may include wired or wireless interfaces. Examples of wired interfaces include, for example, a parallel interface, a Universal Serial Bus (USB) interface, an Ethernet interface, an optical interface, or any other type of wired communications interface now known or later developed. Examples of wireless interface include, for example, a Bluetooth interface, an IEEE 802.11 (and its variants) interface, a cellular (such as GSM, CDMA, UMTS, EV-DO, WiMAX, or LTE) interface, a Zigbee interface, or any other type of wireless communications interface now known or later developed.

In one embodiment, the storage 204 may be used for storing data from various sensors 206 of the robot 200. The storage 204 may also be used for storing program instructions for execution by the processor 202. The processor 202 may include one or more processors or other data processing subsystems. The processor 202 may be coupled to the storage 204 and may be configured to control the robot 200 based on the program instructions stored at least partially in the storage 204. The processor 202 may also be configured to receive and interpret data from the various sensors 206 on the robot 200. Examples of sensors 206 that may be configured for use on the robot 200 include, for example, smoke sensors, light sensors, radio sensors, infrared sensors, microphones, gyroscopes, accelerometers, cameras, radars, capacitive sensors, touch sensors, or any other type of sensor now known or later developed.

The robot 200 may also have electromechanical actuation devices 208 configured to enable the robot 200 to move about its environment or interact with objects in its environment. For example, the robot 200 may have one or more electromechanical devices 208, such as motors, wheels, movable arms, electromagnets, hands, grasping claws, tool attachments, etc., that enable the robot 200 to move about its environment, interact with objects located in its environment, and/or perform tasks with objects in its environment.

In some embodiments, the various sensors 206 and electromechanical devices 208 on the robot 200 may be modular in nature. For modular sensors 206 and electromechanical devices 208, different modules may be added to or removed from the robot 200 depending on particular requirements. For example, in a low power situation, the robot 200 may remove or perhaps power down one or more modules to reduce power usage. In some situations, the robot 200 may add one or more additional modular electromechanical devices 208 as required. For example, a robot may remove a modular "grasping claw" electromechanical device from its arm, and replace the "grasping claw" electromechanical device with a "tool interface" mechanism configured to accept various tool implements such as a screwdriver, bit driver, knife, wrench, or other tool, etc. to enable the robot to perform a specific task. Similarly, a robot may remove a small-wheeled drive mechanism configured for indoor use, and replace it with a large-wheeled drive mechanism configured for outdoor use. From a sensor standpoint, the robot may remove a camera interface configured for daytime use, and replace it with a night-vision enabled interface configured for use in dark or unlit areas. Other types of modular electromechanical devices 208 and/or modular sensors 206 could be used as well. Robots with modular sensors 206 and electromechanical devices 208 may be advantageous in situations where the robot 200 may need to adapt to different situations and environments and/or use different tools, sensors and/or other attachments to accomplish various tasks.

In some embodiments, the processor 202, storage 204, and sensors 206 of the robot 200 may optionally be components of a removable device 210 indicated by the dashed line shown in the FIG. 2A. For example, the robot 200 may have a number of mechanical actuation devices 208 (e.g., a movable base, one or more grasping claws, robot hands, etc.), and the robot 200 may be configured to receive a removable device 210 to function as the "brains" or control unit of the robot 200. In some embodiments, the removable device 210 may correspond to a mobile telephone, a smartphone, a tablet computer, a laptop computer, etc. For example, the device 210 may be a smartphone configured to plug in to the robot. When plugged in to the robot, the smartphone may form an interactive display configured to receive commands from a human, for example. The smartphone may also provide a robot with sensors (e.g., a camera, compass, GPS receiver, accelerometer, etc.), one or more wireless communications interfaces, and processing capabilities, for example.

In some embodiments, the robot 200 may be able to leverage the sensor and communications capabilities of neighboring client devices to supplement or augment its own sensor and communications capabilities. For example, the robot 200 may access a separate smartphone via a Bluetooth connection, and use the smartphone's cellular data network interface to access the cloud computing system 102 shown in FIG. 1. Similarly, the robot 200 may be configured to connect to other sensors to obtain information. For example, the robot 200 may be configured to connect to security system cameras or other sensors positioned near the entrance of a warehouse to monitor the shipments into and out of the warehouse, for example.

In most embodiments, the robot 200 will have a machine vision system. A robot machine vision system typically includes (i) at least one image sensor configured to obtain image data and (ii) at least one processor configured to process images obtained via the at least one image sensor for use by the robot. In operation, a robot may use its machine vision system (alone or in combination with other sensor systems) to navigate through an area, to identify objects in its environment, to track objects in its environment, to interact with objects in its environment (e.g., grasp and manipulate an object), etc.

In the embodiment shown in FIG. 2A, the robot's 200 machine vision system may be entirely contained within the removable device 210. For example, the robot 200 may rely on (i) an image sensor 206 (e.g., a digital camera) in the removable device 210 to capture images and (ii) processor 202 to process images captured by the image sensor 206. In other embodiments, the robot 200 may have a built-in (i.e., onboard, integrated, etc.) machine vision system that includes (i) a built-in image sensor (or sensors) to capture images and (ii) a built-in processor (or processors) to process images captured by the built-in image sensor(s).

Figure 2B:
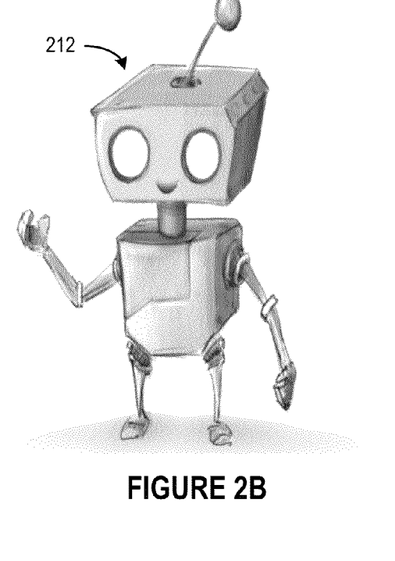
FIG. 2B shows a graphical depiction of an example robot according to some embodiments of the disclosed systems and methods.

FIG. 2B shows a graphical depiction of an example robot 212 according to some embodiments of the disclosed systems and methods. In FIG. 2B, the robot 212 is shown as a mechanical form of a person including arms, legs, and a head. The robot 212 may be configured to receive any number of various modules or components, such a smartphone or tablet computer, which may be configured to operate or control the robot 212, or otherwise be used by the robot 212 for sensor, processing, and/or communications capabilities.

In some embodiments, a smartphone (e.g., removable device 210 of FIG. 2A) can be attached to the robot 212. The smartphone may include one or more components of the robot's 212 machine vision system. In one example, the smartphone may include on one or more image sensors (e.g., a digital camera) that are configured to capture images for the robot 212 to use in connection with its machine vision system. In such embodiments, one or more onboard processors of the robot 212 may be configured to process the images collected by the image sensors of the smartphone. In another example, the robot 212 may have onboard image sensors configured to capture images for the robot 212 to use in connection with its machine vision system, and one or more processors of the smartphone may be configured to process images captured by the one or more onboard image sensors of the robot 212.

Figure 2C:
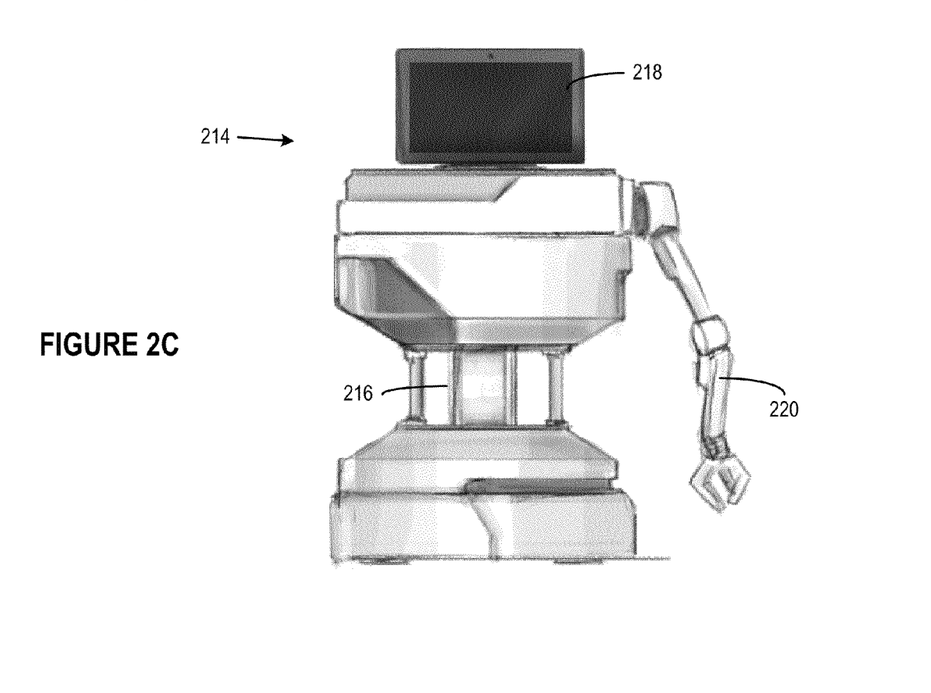
FIG. 2C shows a graphical depiction of another example robot according to some embodiments of the disclosed systems and methods.

FIG. 2C shows a graphical depiction of another example robot 214 according to some embodiments of the disclosed systems and methods. The robot 214 includes a computing device 216, image sensors 218, and a mechanical actuator 220. In this example, the computing device 216 may be a laptop or other type of portable computing device which may be configured to receive data from the sensors 218. The sensors 218 may include a camera, infrared sensors, and other motion sensing or computer vision elements for use in connection with the robot's 214 machine vision system. The mechanical actuator 220 may include an arm with a grasping claw or other type of attachment, a base with wheels, and a motor upon which the computing device 216 and the sensors 218 can be positioned, for example.

Any of the robots illustrated in FIGS. 2A-2C may be configured to operate according to a robot operating system, e.g., an operating system designed for specific functions of the robot. A robot operating system may provide libraries and tools (e.g., hardware abstraction, device drivers, visualizers, message-passing, package management, etc.) to enable robots to execute robot applications. Additionally, a robot operating system may include publish and subscribe functionality and may also include functionality to control components of the robot, such as head tracking, base movement (e.g., velocity control, navigation framework), etc.

Machine Vision System

As described above, in some embodiments, a robot may have a machine vision system that the robot uses (alone or in combination with other sensor systems) to navigate through an area, to identify objects in its environment, to track objects in an environment, to interact with objects in the environment (e.g., grasp and manipulate an object), etc. A particular robot's machine vision system may include (i) at least one image sensor configured to obtain image data and (ii) at least one processor configured to process image data obtained via the at least one image sensor. In operation, the robot's machine vision system can be configured to execute different image processing algorithms depending on the task the robot may be performing, the particular sensor that the robot may be using with its machine vision system, the particular environment that the robot may be navigating through, and/or other factors.

For example, when navigating within a room, it may be desirable for the robot's machine vision system to execute a particular image processing algorithm designed to identify walls, doors, windows, large objects, and people to help the robot navigate through the room without running into obstacles. But when the robot needs to perform a particular task, such as retrieving a red pen from a cup of pens for a user, for example, it may be desirable for the robot's machine vision system to execute a different image processing algorithm designed to discern finer details between smaller objects so that the robot can distinguish between individual pens in the cup rather than simply treating the cup of pens as a single object, or simply treating the desk and all of its contents (including the cup of pens) as a single object, for example.

Additionally, each individual image processing algorithm that can be executed by the robot's machine vision system can also be calibrated and/or fine-tuned by adjusting values for various image processing parameters. Each individual image processing algorithm may have different corresponding image processing parameters, and each parameter may have a wide range of configurable values.

For example, the previously-described image processing algorithm for use in traveling within the office building may have a number of different configurable parameters for fine-tuning the image processing algorithm to operate in different environments. As the robot navigates through the office building, the robot may travel through internal hallways lit by fluorescent lighting along the ceiling, and the robot may also travel within individual offices and conference rooms lit via combinations of overhead fluorescent lighting, wall-mounted or tabletop-based incandescent lighting, and/or natural sunlight from exterior windows. Thus, as the robot travels within the offices, conference rooms, and hallways, the robot may need to periodically recalibrate and/or fine-tune its machine vision system to adjust to environmental changes, such as changes in the type of light source (fluorescent lighting vs. incandescent lighting, vs. sunlight), the direction of the light source (overhead versus from outward facing windows), the intensity of the light source (e.g., in the morning, the east side of the building may have direct sunlight while the west side may have indirect sunlight, etc.), etc.

In some situations, it may be desirable to change the parameters used by a particular image processing algorithm based on changes in the lighting conditions, for example. Changing the parameters for the image processing algorithm may improve the image processing results produced by the machine vision system's application of the image processing algorithm to the image data captured by the robot's image sensor(s). And with better image processing results, the robot may be able to perform its task better. For example, if changing the parameters for a particular image processing algorithm helps the robot to identify walls, doors, windows, objects, and people better, then the robot may be less likely to run in to things as it navigates through a particular area.

In other situations, it may be desirable for the machine vision system to change to a different image processing algorithm altogether (with a whole new set of corresponding image processing parameters). For example, if the office building lost power and the hallway became very dark, then the robot may need to switch to a totally different image processing algorithm designed to process images in low light environments. Like the earlier image processing algorithm, the example "low light" image processing algorithm may also have different corresponding image processing parameters, and each parameter for use with the "low light" algorithm may also have a wide range of configurable values.

Although the examples above focus on changes in lighting conditions, there may be other reasons to use different image processing algorithms configured with different parameters in various situations. For example, if a robot needs to locate and retrieve a particular object based in part on its color (e.g., a red pen, a blue pen, a yellow highlighter, etc.), then it may be desirable for the robot to use an image processing algorithm configured to discern fine differences between small objects with a set of corresponding image processing parameters designed to detect the desired color. Similarly, if the robot needs to locate and retrieve a particular object based in part an image on the surface of the object (e.g., a coffee cup with a particular design or logo), then it may be desirable for the robot to use a different image processing algorithm configured with a set of corresponding image processing parameters to help the robot's machine vision system identify the particular design or logo on the cup. Additionally, if the robot needs to read a bar code, QR code or other type of code on the surface of an object, then it may be desirable for the robot to use yet a different image processing algorithm configured with a set of corresponding image processing parameters to help the robot's machine vision system pick out the details of the code from other information on the surface object.

Machine Vision System Calibration

As described above, machine vision systems in the presently disclosed embodiments may be configurable to execute many different image processing algorithms in various circumstances, and each of the different image processing algorithms may be highly configurable with many different parameter settings having many different values. Having the capability to execute many different highly configurable image processing algorithms may enable a robot to perform a wide variety of tasks in a wide variety of different environmental conditions. However, it may be impractical to store all the potential image processing algorithms available to the machine vision system in the robot's local memory. Similarly, it may difficult for a robot to determine or choose a particular image processing algorithm and a corresponding set of parameter settings for use by its machine vision system in different operating environments and circumstances.

In some examples, a cloud computing system may be used to determine or select an image processing algorithm along with a corresponding set of image processing parameters for use by a robot's machine vision system. In operation, the cloud computing system can be configured to analyze image data received from a robot (and perhaps additional information received from the robot as described later, e.g., environmental data, task data, and/or object data), and then determine or select one or both of (i) an image processing algorithm and (ii) a corresponding set of one or more image processing parameters for use with the selected image processing algorithm. Then, the cloud computing system may send an indication of the selected algorithm and corresponding parameter set (or perhaps even the actual algorithm code configured with the appropriate parameter settings) to the robot for the robot's machine vision system to execute locally. Because the robot's machine vision system can be configured to execute the selected algorithm with the corresponding parameter set locally, the robot is able to perform image processing tasks with little or no network latency that may be present for alternative systems and methods where actual image processing is performed by a cloud computing system or other type of computing system located remotely from the robot.

Because the cloud computing system has substantially more computing power than an individual robot, the cloud computing system can analyze many different algorithms configured with many different combinations of parameter settings to determine an algorithm and parameter set appropriate for a particular robot in a particular operating environment or situation. Additionally, in some examples, because the cloud computing system can be configured to send an indication of the algorithm and a parameter set for the robot's machine vision system to use rather than sending the image processing results back to the robot, the systems and methods described herein make efficient use of bandwidth between the cloud computing system and the robot.

Figure 3:
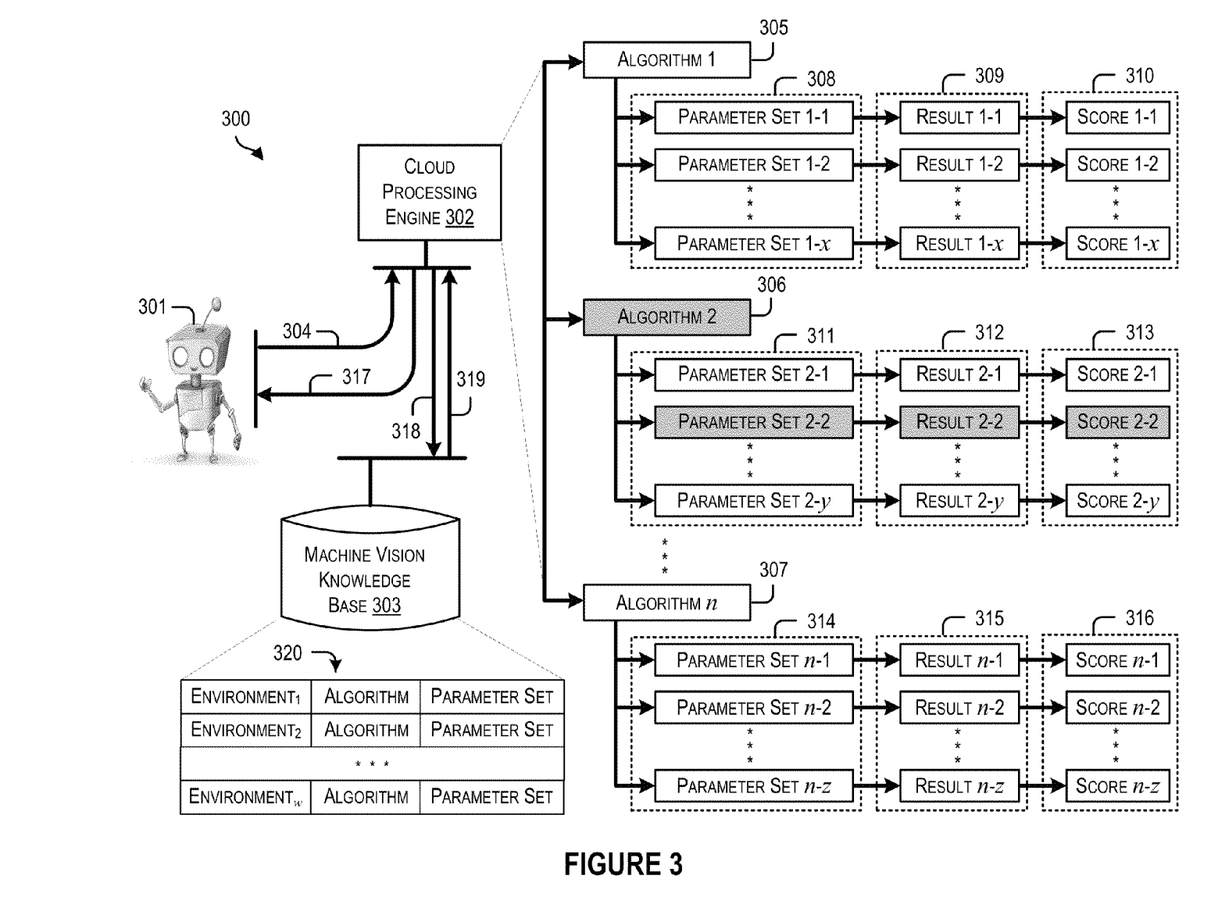
FIG. 3 shows a conceptual block diagram example of using a cloud computing system for machine vision calibration according some embodiments of the disclosed systems and methods.

FIG. 3 shows an example 300 of a robot 301 using a cloud computing system for machine vision calibration according some embodiments of the disclosed systems and methods. The robot 301 may be similar to any of the robots shown and described herein with respect to FIGS. 1 and 2A-2C. The cloud computing system in example 300 includes a cloud processing engine 302 and a machine vision knowledge base 303. The cloud computing system may be similar to the cloud computing system shown and described herein with respect to FIG. 1.

In example 300, the robot 301 sends image data 304 to the cloud processing engine 302 of the cloud computing system. In operation, the cloud processing engine 302 is configured to use the image data 304 to determine a particular image processing algorithm and corresponding parameter set for the robot 301 to use with the robot's 301 machine vision system. After determining a particular image processing algorithm and corresponding parameter set for execution by the robot's 301 machine vision system, the cloud processing engine 302 (alone or in combination with other cloud computing system components) may send the determined image processing algorithm and parameter set to the robot 301 via a response 317.

In some embodiments, the image data 304 may comprise an image captured by an image sensor associated with the robot 301, such as a digital camera, infrared sensor, a 3D scanner, or any type of image sensor now known or later developed. In some embodiments, the image data 304 may additionally or alternatively comprise an image that has a reduced resolution or color space compared to the image captured by the image sensor associated with the robot 301. Additionally, the image data 304 may also contain information about the type of sensor that the robot 301 used to obtain the image associated with the image data 304.

Also, in some embodiments, the robot may also send environmental data along with the image data 304. The environmental data may be associated with the image captured by the robot's 301 image sensor alone or in combination with one or more other of the robot's 301 sensors (e.g., GPS sensors, light sensors, accelerometers, etc.). The environmental data may include an amount of light, a type of light source, a direction of the light source, a geographic location (e.g., Global Positioning System or similar coordinates), a weather condition (sunny, cloudy, rain, etc.), a type of background (color, design/pattern, reflectivity, etc.), a speed that the robot is traveling, or any other type of data associated the robot's 301 environment or surroundings that may have at least some impact on the operation and function of the robot's 301 machine vision system.

In some embodiments, the robot 301 may additionally send information about the task it is trying to accomplish and/or the objects that it is attempting to interact with. In some circumstances, the cloud processing engine 302 may take the task that the robot 301 is trying to accomplish and/or the object or objects that the robot 301 is trying to interact with into consideration when determining or selecting a particular image processing algorithm and corresponding parameter set for the robot 301 to use with its machine vision system.

As mentioned briefly above, the cloud processing engine 302 is configured to (i) analyze the image data 304 (along with perhaps additional data, e.g., environmental data, task data, and/or object data) received from the robot 301, (ii) select an image processing algorithm and a set of one or more parameters (for use with the selected image processing algorithm) for the robot 301 to use with its machine vision system, and (iii) send a response 317 to the robot 301 with an indication of the selected image processing algorithm and corresponding parameter set based on the cloud processing engine's 302 analysis of the image data 304 (and perhaps the additional data as well).

In example 300, the cloud processing engine 302 receives the image data 304 (and perhaps additional data, e.g., environmental data, task data, and/or object data) from the robot 301. The image data 304 includes at least one image. To determine an appropriate image processing algorithm and corresponding parameter set for the robot 301, the cloud processing engine 302 may perform at least one of a few different functions. In some embodiments, the cloud processing engine 302 may apply a plurality of different image processing algorithms 305, 306, 307 to the image included in the image data 304. Additionally or alternatively, the cloud processing engine 302 may analyze environmental data (and/or task data and/or object data) received from the robot 301, compare the received environmental data with environmental data stored in the machine vision knowledge base 303. In some embodiments, the cloud processing engine 302 may perform some combination of the algorithm analysis and environmental data lookup functions. Each of the functions is described below in turn.

For the algorithm analysis function, the cloud processing engine 302 applies a plurality of different image processing algorithms 305, 306, 307 to the image included in the image data 304. Each algorithm 305, 306, and 307 can be applied to the image multiple times, and each application of the image processing algorithm to the image is executed with a set of parameters. For example, image processing algorithm 1 shown as block 305 is applied to the image x number times as shown in block 308, image processing algorithm 2 shown as block 306 is applied to the image y number of times as shown in block 311, and algorithm n shown as block 307 is applied to the image z number of times as shown in block 314.

In operation, the cloud computing system may store many different image processing algorithms for use with many different types of machine vision systems that may be deployed by many different types of robots. However, the robot's 301 machine vision system may not be able to execute every image processing algorithm stored by the cloud computing system. Instead, the image processing algorithms that can be executed by the robot's 301 machine vision system may be based on the type of image sensors associated with the robot 301 and/or the processing capability of the robot 301 (or at least the processing capability available to the robot's machine vision system). Nevertheless, a particular robot's machine vision system may be able to execute many different image processing algorithms. Additionally, new image processing algorithms may be added to the cloud computing system over time as new image processing algorithms are developed, and older image processing algorithms may be removed from the cloud computing system as older algorithms are discarded in favor of newer algorithms.

In some embodiments, the total number of image processing algorithms "n" in the plurality of algorithms 305-307 to be applied to the image received from the robot 301 may include all of the image processing algorithms that can be executed by the robot's 301 machine vision system. In operation, the robot's 301 machine vision system may be able to execute hundreds (or more) different image processing algorithms. But because the cloud processing engine 302 has substantial computing resources compared to the robot 301, the cloud processing engine 302 is able execute many different image processing algorithms very quickly (perhaps even in parallel or at least substantially in parallel), or at least likely more quickly than an individual robot might be able to perform a similar computation.

Alternatively, the cloud processing system 302 may select some subset of all of the image processing algorithms that can be executed by the robot's 301 machine vision system to include in the plurality of "n" algorithms 305-307 to be applied to the image. In these embodiments, the subset of image processing algorithms included in the plurality of "n" algorithms 305-307 to be applied to the image may be based on other information included in the additional data received from the robot 301. For example, the cloud computing system may use environmental data, task data, and/or object data (as previously described) received from the robot 301 to select or determine which algorithms to be applied to the image. In some embodiments, the cloud processing engine 302 may access the machine vision knowledge base 303 to determine which image processing algorithms to apply to the image. The machine vision knowledge base 303 is described in more detail later.

As described above, to determine an appropriate image processing algorithm and corresponding parameter set for the robot 301, the cloud processing engine 302 shown in example 300 applies "n" different image processing algorithms 305, 306, 307 to the image included in the image data 304 received from the robot 301. Example 300 also shows each algorithm of the plurality of algorithms 305, 306, 307 being applied to the image multiple times. In operation, each application of the image processing algorithm to the image is executed with a different set of image processing parameters (which may include some similar or same parameters), and each application of a particular algorithm configured with a corresponding parameter set yields a different image processing result.

As shown in blocks 308 and 309, algorithm 1 is configured with image processing parameter set 1-1 and applied to the image to generate image processing result 1-1, image processing algorithm 1 is configured with image processing parameter set 1-2 and applied to the image to generate image processing result 1-2, and so on through the application of algorithm 1 configured with parameter set 1-x to the image to generate image processing result 1-x. Similarly, algorithm 2 is configured with image processing parameter set 2-1 and applied to the image to generate image processing result 2-1, image processing algorithm 2 is configured with image processing parameter set 2-2 and applied to the image to generate image processing result 2-2, and so on through the application of algorithm 2 configured with image processing parameter set 2-y to the image to generate image processing result 2-y. Finally, as shown in blocks 314 and 315, algorithm n (i.e., the last of the "n" total algorithms in the plurality of algorithms applied to image) is configured with image processing parameter set n-1 and applied to the image to generate image processing result n-1, image processing algorithm n is configured with image processing parameter set n-2 and applied to the image to generate image processing result n-2, and so on through the application of algorithm n configured with parameter set n-z to the image to generate image processing result n-z. In some embodiments, the application of the multiple algorithms configured with the multiple different parameter sets can be performed in parallel or at least substantially in parallel to generate a plurality of different image processing results.

Thus, as shown in example 300, (i) algorithm 1 is applied to the image with "x" different parameter sets to generate "x" different image processing results 309; (ii) algorithm 2 is applied to the image with "y" different parameter sets to generate "y" different image processing results 312, and (iii) algorithm n is applied to the image with "z" different parameter sets to generate "z" different image processing results 316. In operation, "x", "y", and "z" may be very large numbers. For example, if algorithm 1 has three parameters, and each parameter has 15 unique settings, then, at least in some embodiments, "x" may equal $3^{15}$, and thus, the cloud processing engine 302 may apply algorithm 1 to the image up to 14,348,907 times (depending on the specific algorithm, parameters, and parameter settings). But because the cloud processing engine 302 has substantial computing resources compared to the robot 301, the cloud processing engine 302 is able execute an algorithm (even multiple different algorithms) with multiple different parameter sets very quickly (perhaps even in parallel or at least substantially in parallel), or at least likely more quickly than an individual robot might be able to perform a similar computation (or set of computations).

For image processing algorithms with many different parameters having many different settings, the total number of parameter sets (and resulting image processing results) could be quite large—perhaps even hundreds of millions or more. Therefore, in some embodiments, the cloud processing system 302 may select some subset of the total number of parameter sets to use with an algorithm. For example, for algorithm 1 shown in block 305, the subset of "x" parameter sets 308 may be based on the additional data received from the robot 301. In operation, the cloud computing system may use the additional data (e.g., environmental data, task data, and/or object data as previously described) to determine a subset of parameter sets to use when applying a particular algorithm to an image. In some embodiments, the cloud processing engine 302 may access the machine vision knowledge base 303 to determine which parameter sets to use when applying a particular algorithm to an image. The machine vision knowledge base 303 is described in more detail later.

In example 300, after applying the plurality of algorithms 305, 306, 307 configured with the plurality of parameter sets 308, 311, 314 to the image to produce the plurality of image processing results 309, 312, 315, the cloud processing engine 302 then determines a quality score for each image processing result. For example, the cloud processing engine 302 determines a quality score for each of the different image processing results 309 (result 1-1 through result 1-x) generated via the application of algorithm 1 configured with the different parameter sets 308 (parameter set 1-1 through parameter set 1-x), thereby generating "x" different quality scores 310 (score 1-1 through score 1-x). The cloud processing engine 302 calculates quality scores for each of the other image processing results as well.

In some embodiments, the quality score generated for an individual image processing result may be based on a comparison of one or more attributes of the individual image processing result with a set of one or more quality metrics associated with the algorithm that was used to generate the individual image processing result. In other embodiments, the quality score generated for an individual image processing result may be based on objective quality measures that may be relevant to multiple (or perhaps all) of the image processing algorithms. In still further embodiments, the quality score generated for an individual image processing result may be based on a combination of algorithm-specific metrics and objective metrics.

After generating the plurality of quality scores 310, 313, and 316, the cloud processing engine 302 determines which quality score is the highest. After determining the highest quality score, the cloud processing engine 302 selects the image processing algorithm and the parameter set that was used to generate the image processing result having the highest score, and then the cloud processing engine 302 sends an indication of the selected algorithm and parameter set to the robot 301 via response 317. In situations where multiple image processing results have the highest score, the cloud processing engine 302 may be configured to select one of the multiple highest scoring results based in part on environmental data, task data, and/or object data (as previously described) received from the robot 301. In some embodiments, rather than selecting the image processing result having the highest quality score, the cloud processing engine 302 may instead select an image processing result having a quality score that meets or exceeds a minimum quality score threshold.

In example 300, quality score 2-2 is shaded to indicate that it has the highest quality score of the different sets of quality scores 310, 313 and 316 that were determined for the corresponding sets of image processing results 309, 312, and 315. Because image processing result 2-2 had the highest quality score, the cloud processing system 302 in example 300 is shown selecting algorithm 2 and parameter set 2-2 as the algorithm and parameter set for the robot 301 to use with its machine vision system. In operation, the cloud processing engine 302 (alone or in combination with other cloud computing system components) sends the robot 301 a response 317 based on the selected algorithm and parameter set.

In some embodiments, the robot 301 may have copies of the program code for one or more commonly used image processing algorithms. In such embodiments, the response 317 sent from the cloud processing engine 302 to the robot 301 may include an indication of the selected algorithm and an indication of the parameter settings. When the robot 301 receives the indication in the response 317, the robot's 301 machine vision system may execute the indicated algorithm configured with the indicated parameter settings. In other embodiments, the robot 301 may not have a copy of the program code for the selected image processing algorithm. In such embodiments, the response 317 sent from the cloud processing engine 302 to the robot 301 may also include program code for the selected image processing algorithm. In such embodiments, after the robot 301 receives the program code for the selected algorithm along with the selected parameter settings, the robot's 301 machine vision system can execute the selected algorithm with the selected parameter settings.

In some embodiments, the cloud processing engine 302 may also send the robot 301 one or more quality metrics associated with the selected image processing algorithm. Additionally or alternatively, the robot 301 may also store one or more objective metrics. In operation, the robot 301 may periodically measure the performance of its machine vision system based in part on one or more of the received quality metrics associated with the selected algorithm and/or the objective quality metrics. If the performance of the robot's machine vision system starts to decline, the robot 301 may obtain and send new image data 304 (and perhaps additional data) to the cloud processing engine 302, and the cloud computing engine 302 may select either (i) a new parameter set to use with the current algorithm being executed by the robot's machine vision system (which would be the algorithm previously selected by the cloud processing engine 302) or (ii) a new algorithm and corresponding parameter set.

There are multiple ways that the robot 301 can determine that its machine vision system is starting to degrade. For example, any set of one or more of the following conditions could be sufficient to trigger the process of obtaining an sending new image data (perhaps along with additional data) to the cloud processing system 302 for selecting a new parameter set or a new algorithm and parameter set: (i) the quality score of an image processing result falls below a threshold quality score; (ii) the quality score of a later image processing results differs more than a predetermined amount from the quality score of an earlier image processing result; (iii) the rate of change in quality scores of image processing results measured over a period of time is greater than a threshold rate of change; or (iv) any combination of the foregoing. Other methods of measuring algorithm performance degradation could be used as well.

The selection of the new parameter set or algorithm and parameter set may be performed by any of the methods described herein. For example, the cloud computing system 302 may conduct the multiple algorithm analysis described above to determine a new parameter set or new algorithm and parameter set. Similarly, the cloud computing system 302 could query the machine vision knowledge base 303 to determine a new parameter set or new algorithm and parameter set. Likewise, the cloud computing system 302 could query the machine vision knowledge base 303 to select a set of candidate algorithms and/or parameter sets for use in a multiple algorithm analysis described herein.

In some examples, an advantage to having the robot 301 monitor the performance of its machine vision system locally is that the robot can be configured to determine when it needs to update the algorithm being executed by its machine vision system. The robot can continue using the current algorithm with its current parameter set until it receives an updated parameter set (or an indication of a new algorithm with a new parameter set) from the cloud computing system. Thus, the transition between a prior machine vision system configuration and an updated machine vision system configuration is substantially seamless. Also, because the robot can be configured to send image data to the cloud computing system periodically, the bandwidth required for the machine vision system calibration methods described above can be lower than a comparable machine vision system calibration method where the robot streams image data to a cloud computing system for analysis and processing.

Machine Vision Knowledge Base

As mentioned above, some embodiments may include a machine vision knowledge base 303. In addition to sending the response 317 to the robot 301, the cloud computing engine 302 may also send (i) at least some of the image data 304, (ii) at least some of the additional data (e.g., environmental data, task data, and/or object data) if applicable, and (iii) at least some of the information associated with the response 317 to the machine vision knowledge base 303.

For example, in some embodiments, after the cloud processing engine 302 has selected a particular algorithm and corresponding parameter set based on the above-described multiple algorithm analysis process, the cloud processing engine 302 may send the selected algorithm and parameter set (or at least an indication of the selected algorithm and parameter set) to the machine vision knowledge base 303 along with the environmental data, task data, and/or object data (as previously described) that may have been received from the robot 301 along with the image data 304.

Example 300 shows the machine vision knowledge base 303 storing example dataset 320 which includes correlations of different environmental data with different combinations of algorithms and parameter sets based on results from the cloud processing engine's 302 analysis of many different images received from many different robots. In operation, the machine vision knowledge base 303 can be configured to store the "best" algorithms and parameter sets (e.g., most often used algorithms and parameter sets) for use by robots in various environments. For example, different algorithms and parameter sets could be correlated or associated with certain lighting conditions, e.g., particular type of light source, particular direction of light source, particular intensity of light source, etc. Similarly, different algorithms and parameter sets could be correlated or associated with certain locations, e.g., certain GPS coordinates, certain rooms of a house or a building, etc.

In some embodiments, the cloud processing engine 302 can be configured to determine or infer certain environmental conditions rather than rely on environmental data received from a robot. Determining or inferring environmental conditions might be advantageous in situations where a robot lacks sensors to record certain environmental conditions. For example, for outdoor images and/or for indoor images affected by sunlight from windows, the cloud processing engine 302 could infer the direction and intensity of sunlight based on a robot's location and current weather data at that location, and the inferred direction and intensity of sunlight and the local weather conditions could be correlated with certain algorithms and parameter sets in the machine vision knowledge base 303.

Example data 320 shows the machine vision knowledge base 303 storing "w" different environments, where each environment has a corresponding algorithm and parameter set. Different environments (as defined by environmental data) may be associated with the same corresponding algorithm and parameter set. In operation, the number "w" of different environments may be very large. In some embodiments, the machine vision knowledge base 303 may even be configured to store many hundreds of millions of different environments and their corresponding algorithms and parameter sets. In some embodiments, the machine vision knowledge base 303 may also include datasets including correlations with task and/or object data with various algorithms and parameter sets as well. Although the example data 320 is shown as a table, other types of data sets and data structures could be used as well.

After the machine vision knowledge base 303 has amassed a large collection of different environmental data, task data, and/or object data associated with various algorithms and parameter sets based on analyses of image data received from many different robots, the cloud processing engine 302, in some embodiments, may be configured to query the machine vision knowledge base 303 based on environmental data, task data, and/or object data received from a particular robot to select an algorithm and parameter set for use by the particular robot. In some embodiments, the cloud processing engine 302 may not need to perform the multiple algorithm analysis procedure described above if it is able to select an appropriate algorithm and parameter set based on a machine vision knowledge base 303 query. Thus, later robots that need to configure their machine vision systems for operation in a particular environment can benefit from the algorithms and corresponding parameter sets that the cloud computing system 302 has previously determined for earlier robots that have operated in the same (or similar) environment as the later robot.

For example, when the cloud processing engine 302 receives environmental data, object data, and/or task data from a robot, such as robot 301, the cloud processing engine 302 may search or query the machine vision knowledge base 303 to identify an algorithm and parameter set that is correlated or otherwise associated with the same or similar environmental data, object data, and/or task data received from the robot 301. If the machine vision knowledge base 303 contains an algorithm with a corresponding parameter set that is correlated or associated with the same or similar environmental data, object data, and/or task data received from the robot 301, then the cloud processing engine 302 may simply return that particular algorithm and parameter set to the robot 301 in the response 317 without having to perform the multiple algorithm analysis procedure described above.

Alternatively, when the cloud processing engine 302 receives environmental data, object data, and/or task data associated with a particular image from the robot 301, the cloud processing engine 302 may search or query the machine vision knowledge base 303 to identify one or more candidate algorithms and parameter sets that are correlated with the same or similar environmental data, object data, and/or task data received from the robot 301 in the image data 304. The candidate algorithms and parameter sets for the different environmental conditions (or tasks, objects, etc.) selected from the machine vision knowledge base 302 may be based on a history of the algorithms and parameter sets determined by the multiple algorithm analysis process described above. After identifying the candidate algorithms and parameter sets, the cloud processing engine 302 may then perform the multiple algorithm analysis process described above to select one of the algorithms and parameter sets to return to the robot 301 in the response 317. Thus, in some embodiments, the cloud computing system can use the machine vision knowledge base 303 to reduce the total number of algorithms and parameter sets to evaluate in the multiple algorithm analysis process described above.

Additionally, in some embodiments, the cloud computing system may be configured to periodically re-evaluate algorithms and parameter sets that have previously been correlated or associated with particular environmental data, task data, and/or object data stored in the machine vision knowledge base 303. In some instances, the cloud computing system may revise the algorithms and parameter sets associated with particular environmental data, task data, and/or object data based on more detailed algorithm analyses.

For example, the cloud processing engine 302 may select an algorithm and parameter set for the robot 301 based on a "first pass" analysis of a limited number of algorithms and parameter sets. Analyzing a limited number of algorithms and parameter sets in a "first pass" manner may enable the cloud processing engine 302 to quickly identify and select an acceptable (but perhaps not optimal) algorithm and parameter set for the robot 301 to use so that the cloud processing engine 302 can send the robot 301 a quick response. However, the cloud processing engine 302 may be able to determine a better algorithm and parameter set after analyzing the image with a greater number of algorithms and parameter sets. Thus, during timeframes where the cloud processing engine 302 may be receiving fewer machine vision system calibration requests from robots, the cloud processing engine 302 can re-visit the earlier results of the "first pass" analysis to determine whether better performing algorithms and parameter sets can be found for the image. And if the cloud processing engine 302 finds a better performing algorithm and/or parameter set for that particular image, the cloud processing engine 302 may update the data in the machine vision knowledge base 303 to associate the better performing algorithm and/or parameter set with the environmental data, object data, and/or task data that was received along with the image on which the cloud processing engine 302 previously performed the quick "first pass" analysis.

Similarly, in some embodiments, the cloud processing engine 302 may also be configured to re-run analyses on previously-received images when new image processing algorithms become available. If the new image processing algorithm performs better in certain environments, then the machine vision knowledge base can be updated accordingly. In this manner, the cloud processing engine 302 improves the data in the machine vision knowledge base 303 over time so that better-performing algorithms and corresponding parameter sets can be returned to robots in response to machine vision calibration requests.

Example Methods of Calibrating Machine Vision Systems

Figure 4:
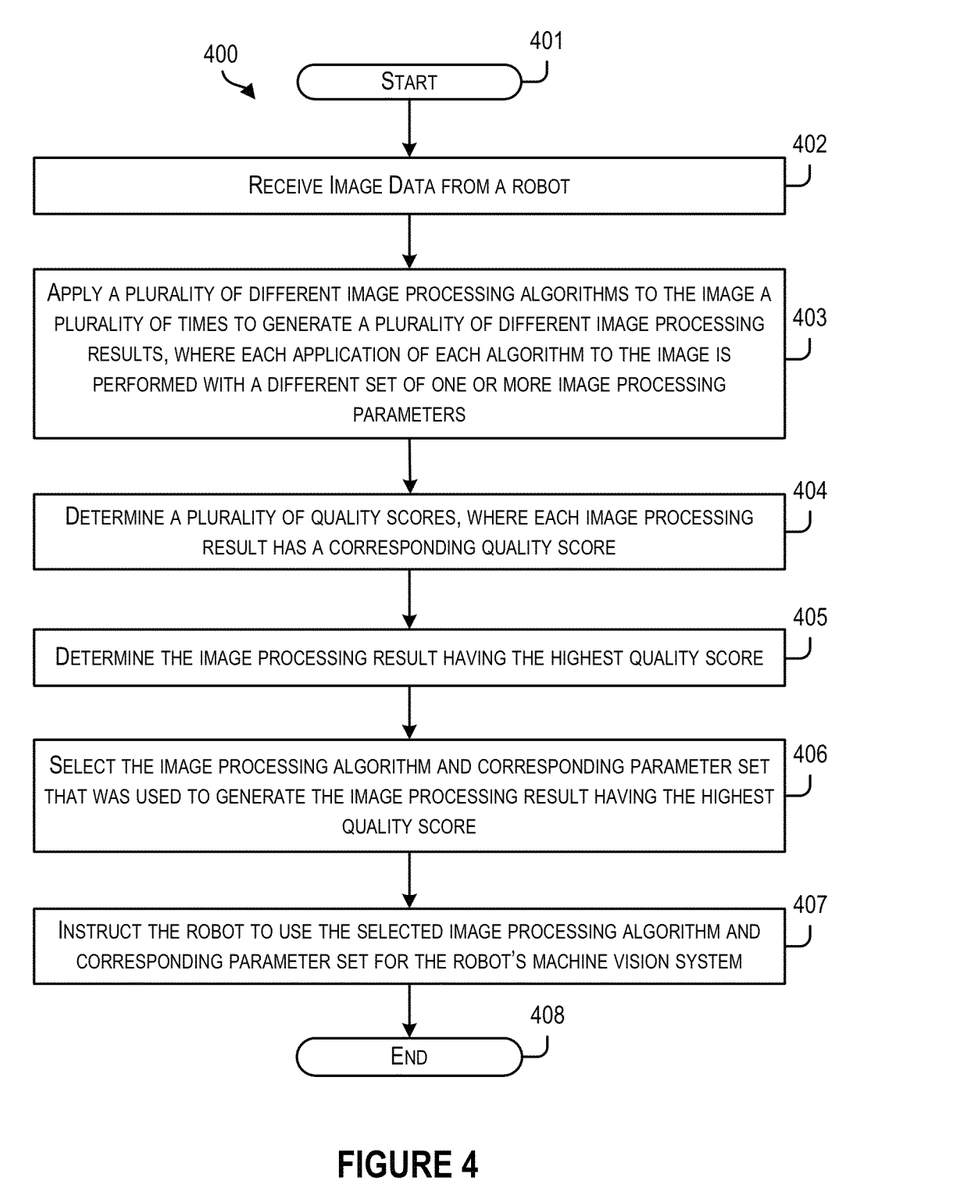
FIG. 4 shows an example method for use by a cloud computing system to calibrate machine vision systems for robots according to some embodiments.

FIG. 4 shows an example method 400 for use by a cloud computing system to calibrate machine vision for robots according to some embodiments. The cloud computing system and the robot may be similar to any of the cloud computing systems (and their cloud computing components) and robots described herein with respect to FIGS. 1-3.

Method 400 begins at block 401. At block 402, a cloud computing system receives image data from a robot. The image data may be similar to the image data described previously herein. The cloud computing system may also receive additional data, e.g., environmental data, task data, and/or object data as described herein.

At block 403, the cloud computing system applies a plurality of different image processing algorithms to the image a plurality of times to generate a plurality of different image processing results, where each application of each algorithm to the image is performed with a different set of one or more image processing parameters. The application of multiple algorithms to the image may be similar to the procedure described herein with respect to FIG. 3.

At block 404, the cloud computing system determines a plurality of quality scores, where each image processing result has a corresponding quality score. Determining a quality score may be similar to the procedures for determining a quality score described herein with respect to FIG. 3. Then, at block 405, the cloud computing system determines which image processing result of the plurality of image processing results from block 404 has the highest quality score. Determining which image processing result has the highest quality score may be similar to the procedures for determining a highest quality score described herein with respect to FIG. 3. In other examples, at block 405, the cloud computing system may determine which image processing result of the plurality of image processing results from block 404 is above a threshold quality score, and if multiple image processing results are above the threshold quality score, the cloud computing system may select any algorithm and parameter set corresponding to any result above the threshold quality score.

At block 406, the cloud computing system selects the image processing algorithm and the corresponding set of one or more image processing parameters that were used to generate the image processing result that had the highest quality score from block 405. Then, at block 407, the cloud computing system instructs the robot that sent the image data to use the selected image processing algorithm and corresponding parameter set for its machine vision system. Example method 400 then ends at block 408.

Figure 5:
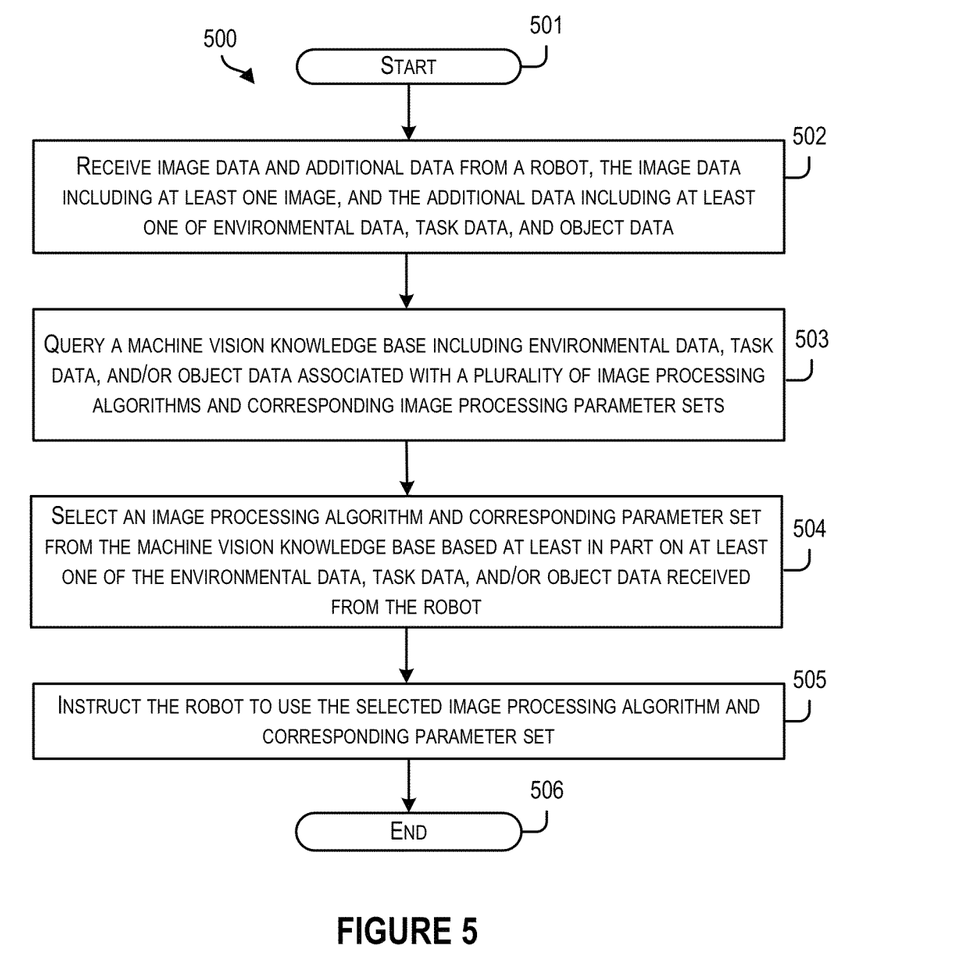
FIG. 5 shows another example method for use by a cloud computing system to calibrate machine vision systems for robots according to some embodiments.

FIG. 5 shows another example method 500 for use by a cloud computing system to calibrate machine vision systems for robots according to some embodiments. The cloud computing system and the robot may be similar to any of the cloud computing systems (and their cloud computing components) and robots described herein with respect to FIGS. 1-3.

Method 500 begins at block 501. At block 502, the cloud computing system receives, from a robot, (i) image data and (ii) additional data. The image data includes at least one image (but could perhaps include multiple images). The additional data includes at least one of environmental data, task data, and/or object. The image data, at least one image, environmental data, task data, and/or object data of block 502 may be similar to the image data, at least one image, environmental data, task data, and/or object data described elsewhere herein.

At block 503, the cloud computing system queries a machine vision knowledge base. The machine vision knowledge base includes a plurality of different image processing algorithms and corresponding image processing parameter settings, where individual algorithms and parameter sets are associated with different environmental data, task data, and/or object data. The machine vision knowledge base of block 503 may be similar to the machine vision knowledge base shown and described herein with respect to FIG. 3.

At block 504, the cloud computing system selects an image processing algorithm and corresponding parameter set from the machine vision knowledge base of block 503 based at least in part on at least one of (i) the environmental data received from the robot, (ii) the task data received from the robot, and/or (iii) the object data received from the robot. Thus, the robot's machine vision system can be calibrated for its current environment, task, etc. based at least in part on results from the machine vision knowledge base query. After selecting the image processing algorithm and corresponding parameter set in block 504, the cloud computing system instructs the robot to use the selected image processing algorithm and corresponding parameter set at block 505. Example method 500 then ends at block 506.

In alternative embodiments (not shown), block 505 may include selecting a plurality of image processing algorithms and corresponding parameter sets from the machine vision knowledge base based at least in part on at least one of (i) the environmental data received from the robot, (ii) the task data received from the robot, and/or (iii) the object data received from the robot. The cloud processing system may then use the selected plurality of image processing algorithms and corresponding parameter sets in a multiple algorithm analysis procedure similar to the procedure described in blocks 403-406 shown and described herein with respect to FIG. 4. Then, after selecting a particular image processing algorithm and corresponding parameter set in in a fashion similar to that described in blocks 403-406 of FIG. 4, the cloud computing system can instruct the robot to use the particular image processing algorithm and corresponding parameter set at block 505. Example method 500 then ends at block 506.

Figure 6:
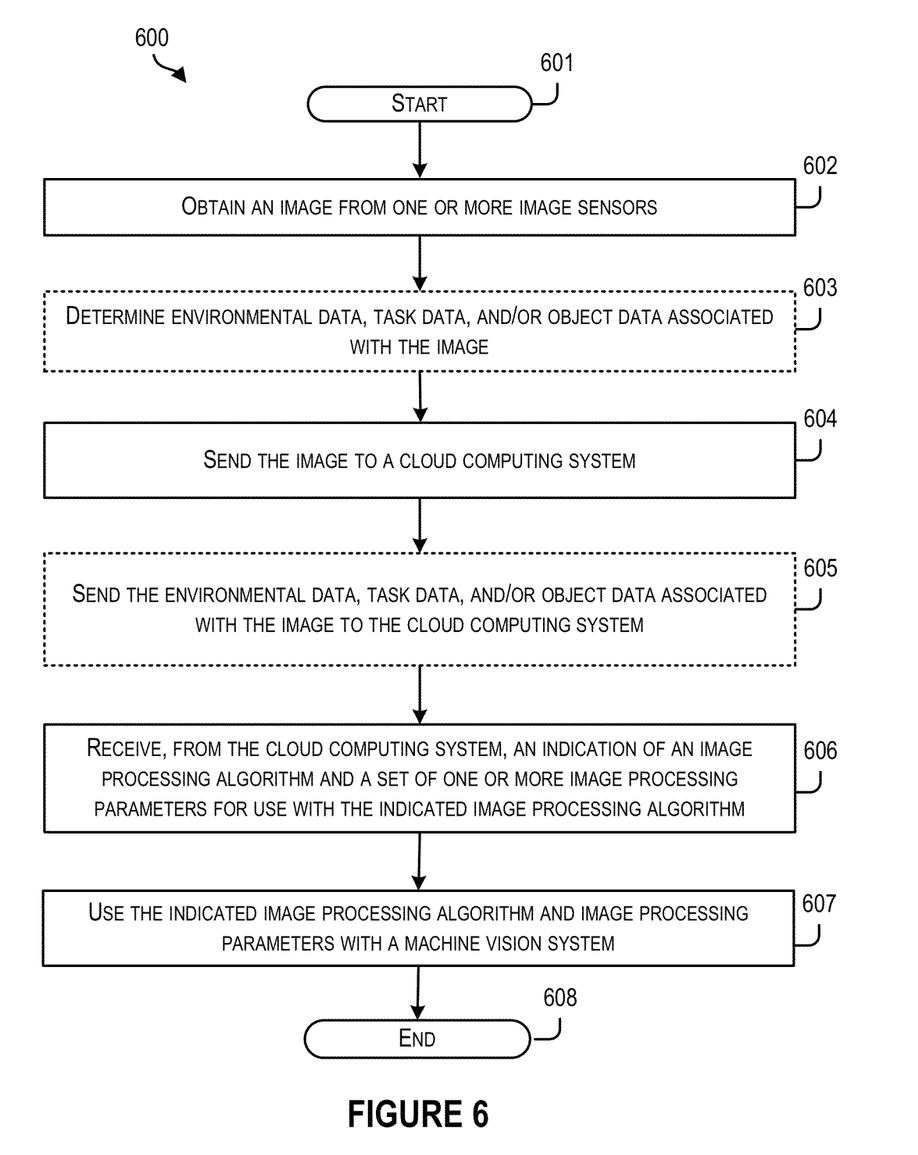
FIG. 6 shows an example method for use by a robot for calibrating its machine vision system with a cloud computing system according to some embodiments.

FIG. 6 shows an example method 600 for use by a robot for calibrating its machine vision system with a cloud computing system according to some embodiments. The cloud computing system and the robot may be similar to any of the cloud computing systems (and their cloud computing components) and robots described herein with respect to FIGS. 1-3.

Example method 600 begins at block 601. At block 602, the robot obtains an image from one or more image sensors. In some embodiments, the image sensor may be integrated with the robot. In other embodiments, the image sensor may be integrated with a detachable device (e.g., a smartphone or similar mobile computing device with a sensor) as describe herein with respect to FIGS. 2A, 2B, and 2C. The image sensor of block 602 may be similar to any of the image sensors described elsewhere herein.

At block 603, the robot may optionally determine environmental data, task data, and/or object data associated with its surroundings, a task it is attempting to perform, and/or an object it is attempting to interact with. The environmental data, task data, and/or object data of block 603 may be similar to any of the environmental data, task data, and/or object data described elsewhere herein.

At block 604, the robot sends the image to a cloud computing system. In embodiments where the robot has determined environmental data, task data, and/or object data associated with the image in block 603, the robot may also send the determined environmental data, task data, and/or object data associated to the cloud computing system at block 605.

After the cloud computing system receives the image (along with the optional environmental data, task data, and/or object data), the cloud computing system selects an image processing algorithm and corresponding parameter set based on an analysis of the image received from the robot (and perhaps also based on the environmental data, task data, and/or object data received from the robot) according to any of the procedures shown and described herein with respect to FIGS. 3-5.

At block 606, the robot receives, from the cloud computing system, an indication of an image processing algorithm and a set of one or more image processing parameters for use with the indicated image processing algorithm. In some embodiments, the robot may additionally receive program code associated with the indicated image processing algorithm as described herein.

Then, at block 607, the robot uses the image processing algorithm and corresponding parameter settings indicated at block 606 with its machine vision system. Example method 600 then ends at block 608.

While various aspects and embodiments have been disclosed herein, other aspects and embodiments will be apparent to those skilled in the art. The various aspects and embodiments disclosed herein are for purposes of illustration only and are not intended to be limiting, with the true scope and spirit being indicated by the following claims.

What is claimed is:
1. A method comprising:
receiving a first image from a computing device;
applying a plurality of different image processing algorithms to the first image a plurality of times to generate a corresponding plurality of image processing results, wherein each application of an individual image processing algorithm to the first image is executed with a different corresponding parameter set comprising one or more image processing parameters;

determining a plurality of quality scores, wherein each image processing result of the plurality of image processing results has a corresponding quality score;

selecting an image processing algorithm and a corresponding parameter set, wherein the selected image processing algorithm and parameter set correspond to an image processing result having a corresponding quality score above a threshold quality score;

instructing the computing device to use the selected image processing algorithm and the selected parameter set for image processing operations;

receiving additional data associated with the first image from the computing device, wherein the additional data comprises at least one of environmental data, task data, and object data;

associating the additional data with the selected image processing algorithm and parameter set; and storing an indication of the association between the selected image processing algorithm, parameter set, and additional data in a machine vision knowledge base.

2. The method of claim 1, further comprising:
sending one or both of the selected image processing algorithm and parameter set to the computing device.

3. The method of claim 1, further comprising:
based at least in part on the additional data, determining at least one of (i) the plurality of image processing algorithms to apply to the first image and (ii) one or more sets of image processing parameters for use with an individual image processing algorithm.

4. The method of claim 1, wherein applying the plurality of different image processing algorithms to the received first image is performed substantially in parallel by a cloud computing system.

5. The method of claim 1, wherein determining the plurality of quality scores comprises evaluating an individual image processing result based on a set of one or more quality metrics.

6. The method of claim 1, further comprising:
receiving a second image from the computing device;
selecting one or more of an updated image processing algorithm and/or an updated parameter set based at least in part on one of (i) an analysis of the second image and (ii) a machine vision knowledge base lookup; and
instructing the computing device to use the selected updated image processing algorithm and/or updated corresponding parameter set for image processing operations.

7. A method comprising:
receiving environmental data from a robot, wherein the environmental data includes one or more attributes associated with an area in which the robot is operating;
accessing an index stored on tangible, non-transitory computer readable media, wherein the index comprises environmental data, image processing algorithms, and parameter sets for use with image processing algorithms, and wherein individual environmental data in the index has a corresponding image processing algorithm and parameter set comprising one or more image processing parameters for use with the corresponding image processing algorithm;

selecting an image processing algorithm with a parameter set from the index that corresponds to one or more attributes of the environmental data received from the robot; and instructing the robot to use the selected image processing algorithm and parameter set to process images obtained by one or more image sensors associated with the robot.

8. The method of claim 7, wherein the environmental data comprises at least one of (i) an amount of light, (ii) a type of light source, (iii) a direction of the light source, (iv) a geographic location, (v) a weather condition, (vi) a background pattern in an image, and (vii) a background color in an image.

9. A method comprising:
capturing a first image with an image sensor associated with a robot;
recording first environmental data associated with an area in which the robot is operating;
sending the first image and the first environmental data to a cloud computing system;
receiving instructions from the cloud computing system to use an identified image processing algorithm configured with an identified parameter set to process images obtained by the image sensor, wherein the instructions are based at least in part on the first image or the first environmental data sent to the cloud computing system; and
executing the identified image processing algorithm configured with the identified parameter set via one or more processors associated with a machine vision system associated with the robot.

10. The method of claim 9, further comprising:
receiving at least one of the identified image processing algorithm and the identified parameter set from the cloud computing system.

11. The method of claim 9, further comprising:
determining a plurality of corresponding quality scores for one or more image processing results generated by applying the identified image processing algorithm configured with the identified parameter set to a corresponding plurality of images captured with the image sensor; and
sending a second image and second environmental data from the robot to the cloud computing system in response to determining at least one of (i) one quality score of the plurality of quality scores falls below a threshold, (ii) a difference between two quality scores of the plurality of quality scores exceeds a threshold, and (iii) a rate of change of quality scores over a predetermined timeframe exceeds a threshold.

12. A system comprising:
one or more communication interfaces configured to receive environmental data sent from a robot, wherein the environmental data describes an environment in which the robot is operating;
a machine vision knowledge base configured to store a plurality of environmental data and a plurality of image processing algorithms with corresponding parameter sets for use with the image processing algorithms, wherein individual environmental data in the machine vision knowledge base has a corresponding image processing algorithm and parameter set; and
one or more processors configured to (i) select an image processing algorithm with a parameter set from the machine vision knowledge base based at least in part on the environmental data received from the robot, and (ii) instruct the robot to use the selected image processing algorithm and parameter set to process images obtained via one or more image sensors associated with the robot.

13. The system of claim 12, wherein the environmental data comprises at least one of (i) an amount of light, (ii) a type of light source, (iii) a direction of the light source, (iv) a geographic location, (v) a weather condition, (vi) a background pattern in an image, and (vii) a background color in an image.

14. The system of claim 12, wherein the one or more communications interfaces are further configured to send one or both of the selected image processing algorithm and the parameter set to the robot.

15. A computing device comprising:
an image sensor configured to record a first image;
one or more sensors configured to record environmental data associated with an area in which the computing device is located;
a communication interface configured to (i) send the first image and the environmental data to a cloud computing system, and (ii) in response to sending the first image and the environmental data to the cloud computing system, receive instructions from the cloud computing system to use an identified image processing algorithm configured with an identified parameter set to process images obtained by the image sensor; and
one or more processors configured to execute the identified image processing algorithm configured with the identified parameter set to process further images recorded with the image sensor.

16. The computing device of claim 15, further comprising:
tangible, non-transitory computer readable media configured to store at least the identified image processing algorithm and the identified parameter set.

17. The computing device of claim 15, wherein the environmental data comprises at least one of (i) an amount of light, (ii) a type of light source, (iii) a direction of the light source, (iv) a geographic location, (v) a weather condition, (vi) a background pattern in an image, and (vii) a background color in an image.

18. The computing device of claim 15, wherein the one or more processors are further configured to (i) determine a plurality of corresponding quality scores for one or more image processing results generated by applying the identified image processing algorithm configured with the identified parameter to set to a corresponding plurality of images from the image sensor; and (ii) initiate the transmission of a second image and second environmental data from the computing device to the cloud computing system in response to determining at least one of (a) one quality score of the plurality of quality scores falls below a threshold, (b) a difference between two quality scores of the plurality of quality scores exceeds a threshold, and (c) a rate of change of quality scores over a predetermined timeframe exceeds a threshold.

19. The computing device of claim 15, wherein the computing device is a component of a robot.

20. An article of manufacture comprising tangible, non-transitory computer readable media having instructions stored therein, the instructions comprising:
instructions for receiving at least one image from a computing device;
instructions for applying a plurality of different image processing algorithms to the at least one image a plurality of times to generate a corresponding plurality of image processing results, wherein an individual application of an individual image processing algorithm to the at least one image is executed with a different corresponding parameter set comprising one or more parameters;
instructions for determining a plurality of quality scores, wherein individual image processing results of the plurality of image processing results have a corresponding quality score;
instructions for selecting an image processing algorithm and a corresponding parameter set corresponding to an image processing result having a corresponding quality score above a threshold quality score;
instructions for controlling the computing device to use the selected image processing algorithm and the selected parameter set for image processing operations;
instructions for receiving additional data associated with the at least one image from the computing device, wherein the additional data comprises at least one of environmental data, task data, and object data and
based at least in part on the additional data, determining at least one of (i) the plurality of image processing algorithms to apply to the at least one image and (ii) one or more sets of image processing parameters for use with an individual image processing algorithm.

21. An article of manufacture comprising tangible, non-transitory computer readable media having instructions stored therein, the instructions comprising:
instructions for causing an image sensor to record an image;
instructions for causing at least one environmental sensor to record environmental data associated with a location from where the image is recorded;
instructions for sending the image and the environmental data to a cloud computing system for analysis;
instructions for receiving from the cloud computing system, at least an identification of an image processing algorithm and a corresponding parameter set for use with the identified image processing algorithm, wherein the identified image processing algorithm and corresponding parameter set are based at least in part on an analysis of the image and the environmental data by the cloud computing system; and
instructions for executing the identified image processing algorithm with the corresponding parameter set to process subsequent images recorded with the image sensor.

* * * * *